United States Patent
Hojat et al.

[11] Patent Number: 6,080,201
[45] Date of Patent: Jun. 27, 2000

[54] INTEGRATED PLACEMENT AND SYNTHESIS FOR TIMING CLOSURE OF MICROPROCESSORS

[75] Inventors: Shervin Hojat, Austin; Paul Gerard Villarrubia, Round Rock, both of Tex.

[73] Assignee: International Business Machines Corporation, Armonk, N.Y.

[21] Appl. No.: 09/021,135

[22] Filed: Feb. 10, 1998

[51] Int. Cl.[7] .................................................. G06F 17/50
[52] U.S. Cl. ................. 703/14; 395/500.07; 395/500.11; 703/19
[58] Field of Search .................... 395/500.02, 500.03, 395/500.04, 500.07, 500.23, 500.35, 500.11, 500.1; 703/14, 19

[56] References Cited

U.S. PATENT DOCUMENTS

| | | | |
|---|---|---|---|
| 5,218,551 | 6/1993 | Agrawal et al. | |
| 5,237,514 | 8/1993 | Curtin . | |
| 5,402,357 | 3/1995 | Schaefer et al. | |
| 5,629,860 | 5/1997 | Jones et al. | 364/490 |
| 5,784,600 | 7/1998 | Doreswamy et al. | 395/558 |
| 5,831,870 | 11/1998 | Folta et al. | 364/490 |
| 5,838,582 | 11/1998 | Mehrotra et al. | 364/490 |
| 5,923,564 | 7/1999 | Jones | 364/489 |
| 5,937,190 | 8/1999 | Gregory et al. | 395/704 |

OTHER PUBLICATIONS

Predam, Massoud and Bhat, Narasimha, "Layout Driven Technology Mapping", 1991, pp. 99–105.

Ishioka, Takashi, Murofushi, Masako, Murakata, "Layout Driven Delay Optimization with Logic Re–synthesis", 1997.

Primary Examiner—Kevin J. Teska
Assistant Examiner—Thai Phan
Attorney, Agent, or Firm—Anthony V. S. England

[57] ABSTRACT

One aspect of the invention relates to a method for improving timing convergence in computer aided semiconductor circuit design. In one particular version of the invention, the method includes the steps of generating a behavioral model of a desired semiconductor circuit, which includes timing constraints for individual paths in the circuit, synthesizing the behavioral model to produce a netlist which represents an implementation of the desired semiconductor circuit mapped to a specific semiconductor technology, the netlist including a list of components in the circuit and a list of nets which connect the components in the circuit, and the step of synthesizing includes performing a timing analysis on the implementation so that the paths in the circuit represented by the netlist meet the timing constraints, the timing analysis being performed using estimated wire lengths for the nets. Next, the components in the netlist are placed into an image representing a predefined area of the semiconductor chip. During this step, actual wire lengths are determined for the nets in the netlist. The steps of synthesizing and placing are then repeated until timing convergences is achieved. Each time the step of synthesizing is repeated, the actual wire lengths from the step of placing are substituted for the estimated wire lengths. Finally, the circuit is routed to produce the final design data.

12 Claims, 6 Drawing Sheets

INTEGRATED PLACEMENT AND SYNTHESIS FOR TIMING CLOSURE OF MICROPROCESSORS

TECHNICAL FIELD

This invention relates generally to the field of semiconductor design, and more particularly to improved synthesis and placement tools useful in designing electrical circuits for semiconductor and microprocessor applications. Still more particularly, the invention relates to providing improved integration between synthesis and placement tools while delivering more accurate design results and faster timing convergence due to the use of improved wire capacitance models.

BACKGROUND OF THE INVENTION

Modern semiconductor design relies heavily on the use of various software tools, which perform the tasks required to implement a desired circuit design onto silicon. In general, the design process begins with a definitional design which, as its name implies, describes the desired logical, timing and power parameters of the desired circuit. The definitional design is typically implemented in a computer readable file written in hardware description language ("HDL") such as Verilog, HDL, VHDL, DSL, etc. The definitional design is also referred to as a behavioral description or model of the circuit. The HDL file is then provided to two categories of tools, which are used to test the design and convert the HDL into other computer readable files needed to actually fabricate the circuit.

The first category includes simulation tools which are used to test the circuit's logical performance, i.e., whether the circuit generates the desired output signals in response to a predefined set of input signals. The simulation tools are typically software implemented processes which are run on a workstation or other computer processors. These tools use the HDL file to create a software model of the definitional design. A variety of simulated inputs may then be applied to the software model. The resulting outputs of the model are recorded and compared to expected outputs to determine whether the definitional design produced the logical results required. Since simulation is concerned, primarily, with the logical performance of the design, simulation tools are largely technology independent, i.e., the design has not been mapped to specific cell libraries which contain data for constructing actual electronic components according to known fabrication processes. Commercially available simulation tools include "SpeedSim," commercially available from Quickturn, Corp.

The second category includes synthesis and implementation tools. Like simulation tools, synthesis and implementation tools are typically implemented in software which runs on a workstation or other computer processor. However, these tools are highly technology dependent and are used to create an implementation of the circuit components onto the chip. Specifically, synthesis tools are used to generate the mapped logic "netlist," which contains a description of the gates and interconnections between gates for the desired circuit. Suitable tools are familiar to those of skill in the art, such as "SYNOPSYS DESIGN COMPILER" commercially available from Synopsys Corp.

The netlist from the synthesis tool is then provided to a placement tool, such as "QPLACE," commercially available from Cadence, Corp. The placement tool determines where the gates of the circuit will be physically located within a location on the chip which has been predesignated to contain the circuit. This location is referred to as the "image."

After the circuit has been placed, the data from the placement tool is provided to a router, such as "CELL3," commercially available from Cadence, Corp. The router generates the fabrication data required to construct the metal lines on the chip that connect the components of the circuit together. After routing, all the files containing the computer data required to fabricate an implementation of the circuit are available. This is referred to as the final design data. The final design data is then sent to manufacturing where the final design data from other circuits on the chip are integrated together, and the actual chip is manufactured.

Of course, significant testing must be performed during the course of synthesizing and implementing the desired circuit to ensure the final design data is accurate. Otherwise, the fabricated chip will not perform as the designers intended. This is described in greater detail with respect to FIG. 1A.

FIG. 1A is a flow chart 100 illustrating a conventional synthesis and implementation process. The process begins in step 102 with the development of the logical behavior, timing constraints, power consumption, physical device size and other requirements for a desired semiconductor circuit. These requirements are purely a matter of design choice and are selected in accordance with the features and performance characteristics desired in the finished integrated circuit. A circuit design engineer then uses the requirements as guidelines to create the HDL description file. The HDL file, as discussed previously, is a computer readable file that contains data representing the necessary logical, timing and other parameters of a circuit which satisfies the requirements. The HDL file is sometimes referred to as the "behavioral model" since it specifies the logical behavior of the circuit. The HDL file is then provided as input to the synthesis tool in step 106.

The synthesis tool, sometimes referred to as the "synthesizer", in step 106 generates a hardware design netlist for the circuit by mapping the HDL description to "standard logic cells", i.e., predefined blocks of electronic components which are connected together to form a suitable implementation of the circuit defined by the HDL description file. The mapping process is well understood in the art. Specifically, the netlist specifies the nature of each electronic component in a generic fashion. For example, one component may be a simple AND gate. The synthesis tool then selects a specific AND gate in the netlist. This process is repeated for every electronic component in the generic net list until all the electronic components are associated with, or mapped, to actual circuits from the cell library. At this point, the net list is sometimes referred to as a mapped netlist. A variety of suitable standard logic cells are commercially available to those of skill in the art. More specifically, a cell selected from a cell library is a basic building block for a circuit design. Within a cell library, the individual cells are typically defined at various levels of abstraction in a hierarchical order. At the lowest level, a cell may be a particular NMOS or PMOS transistor. At a somewhat higher level, a cell may be a collection transistors connected together to create various logical gates.

The lowest level of cells used in a particular design methodology are referred to as "leaf cells." Integrated circuits are built by assembling collections of leaf level cells as building blocks. These building blocks are typically well known circuit components such as multiplexors ("MUXes"), registers, arrays, comparators, and simple Boolean circuits such as ANDs, ORs, AOs, and AOIs. In the general case, these leaf level building blocks can be integrated with any number of levels of hierarchy. For example, a few registers, MUXes and Boolean gates could be used to create a circuit component which performs a particular sub-function of the circuit. This collection could be manipulated by other circuit design tools as a package for purposes of placement onto an area of the chip and integration with other cells or electronic components of the integrated circuit. Next, this package could be used as if it were itself a basic building block to construct additional circuit components which provide an even higher level function on the chip. By continuing in this fashion, it is possible to eventually create a circuit which provides the level of function required by the chip as a whole.

With respect to the exemplary "PowerPC" family of processors, commercially available from IBM and Motorola Corporations, the circuits are generally designed using 2 to 4 levels of hierarchy. Collections of Boolean functions are typically created, and placed in their own level of hierarchy. Each of the collections is called an "RLM" or Random Logic Macro. RLMs are used to implement control logic function. Collections of data flow elements such as MUXes, registers, arrays, etc. are placed into levels of hierarchy that are referred to as "super macros." Super macros and RLMs differ only by convention, that is, Boolean control logic cells are placed in RLMs, and data flow elements are placed in super macros.

After the synthesizer has mapped the HDL description file to a specific technology, it produces a mapped netlist as shown in step 108. As discussed, the netlist produced by the synthesis tool lists all cells in the circuit and the interconnections between them. The interconnections between the components are referred to as "nets." This is depicted in FIG. 1B which shows a component, in this case and an AND gate 10, which is connected by net 12 to an inverter 14 and to OR gate 18. Also, by way of definition, the term "fan-in" is used to refer to the number of inputs that are provided to an individual circuit component. Thus, it will be noted that AND gate 10 has three inputs, 10a, 10b and 10c. Therefore, the fan-in to AND gate 10 is three. Similarly, the term "fan-out" refers to the number of outputs that are driven by a single component. Referring again to AND gate 10, it is seen that the gate drives two separate outputs, i.e., one for inverter 14 and one for OR gate 18. Accordingly, AND gate 10 is said to have a fan-out of two.

The synthesizer uses the design requirements set forth in the HDL description file as it selects and connects the various individual circuit components from the technology library so that the circuit defined by the netlist 108 meets all the design requirements. Often, the most difficult requirements to meet are the timing requirements for the circuit. The timing requirements specify the permissible propagation delay time for signals to travel through the various signal paths in the circuit. A path is a sequence of components and nets through which a particular signal travels. For example, referring again to FIG. 1B, it is seen that whenever a clock signal CLK is received at clocked register 20, a signal is provided from the output of register 20 to an input of register 22 through a path consisting of net 10b, AND gate 10, net 12, inverter 14 and net 24. The time required for a signal to travel from register 20 to register 22 is referred to as the path or propagation delay.

Of course, all paths in the circuit have a designed acceptable propagation delay time. However, for reasons which will be discussed in greater detail herein, the propagation delay time for a path as designed by the synthesizer is often different than the actual delay time of the path after the placement tool has placed it in the image. The difference between the designed delay time and the actual delay time is referred to as the "slack". If the slack is positive or zero, then the path meets the design criteria. If the slack is negative, then the propagation delay time is unacceptable and changes must be made to the circuit to correct its timing performance.

In order to ensure that the circuit defined by the netlist meets all timing requirements before it is provided to the placement tool in step 110, the synthesizer makes use of a timing analyzer as it selects and assembles the circuit components in step 106. Various suitable timing analyzers are commercially available to those of skill in the art, for example, one common timing analyzer is "MOTIVE", commercially available from Viewlogic, Corp. A detailed discussion of the various techniques employed by different timing analyzers is not necessary for a complete understanding of the present invention, and accordingly, only the following general discussion is provided in order to better illustrate the shortcomings of the present techniques.

Referring again to FIG. 1B, it is seen that the propagation delay experienced by a signal traveling from register 20 to register 22 is the sum of the propagation delay due to net 10b, AND gate 10, net 12, inverter 14 and net 24. Since AND gate 10 and inverter 14 are predesigned circuit components from a standard cell library, their propagation delay times are accurately known for any given load. However, the propagation delay time due to nets 10b, 12 and 24 are more problematic.

More particularly, connections between circuit components are typically formed by metal lines on the integrated circuit. All metal lines on an integrated circuit have an inherent capacitance which adds loading to the driving circuit, thus delaying the propagation time of the signal. Moreover, the longer the metal line, the greater the capacitance it has. Thus, it should be clear that the propagation delay time for a signal path, such as the one discussed with respect to FIG. 1B, cannot be accurately determined unless the wire length of the nets in the path are accurately known.

However, since the components of the circuit have not yet been placed, i.e., associated with specific locations in the image, it is impossible for the synthesizer at this point in the process to know the lengths of the nets in the circuit. Thus, the synthesizer in step 106 must rely on estimates of the wire length to generate the "wire models" used to calculate the capacitance, and hence, the propagation delay of the individual paths of the circuit. Generally, these wire models contain wire lengths which are estimated on a statistical basis according to the number of fan-outs found in the individual nets, although other techniques are also known to those of skill in the art.

After the netlist 108 has been generated using estimated wire models, it is provided as input to the placement tool in step 110. Placement techniques are well known in the art. For example, although there are differences, conventional placement tools typically utilize either a variation of a min-cut algorithm, such as that described in Ulrich, "*A Min-Cut Placement Algorithm for General Cell Assemblies Based on a Graph*," proceedings of the 16th Design Automation Conference, 1979, pages 1–10, or a thermal annealing analog algorithm, such as that described in Kirkpatrick, et al., "*Optimization by Simulated Annealing*" Science, Vol. 220, No. 4598, May 13, 1983, pages 671–680, both of which are incorporated herein by reference.

It is generally a goal of the placement tool to arrange the components of the circuit in the image in order to minimize the area consumed by the circuit and provide improvements in the function of the circuit, such as cycle time. After the placement tool has determined a location for each component of the circuit in the image, this data is provided to the router in step 112. Naturally, as the components in the circuit are placed on different locations in the image, the length of the nets connecting individual circuit components change accordingly.

The router uses the component placement data received from the placement tool and the netlist to generate a file representing the required metal connections for the cells in the circuit. After routing in step 112, all data required to generate the final data for fabrication of the circuit is available.

However, the final design must be re-checked in step 116 to ensure that it meets timing requirements before the circuit is fabricated in step 120. This is because the timing analyzer used during synthesis in step 106 relied on estimates of the actual wire lengths, rather than the actual wire lengths determined during placement.

If in step 116 it is determined that the circuit as placed in step 110 no longer meets timing requirements, then the process must proceed to step 118 where some aspect of the design is corrected. As a matter of design choice, a circuit designer may make changes in any one of steps 104, 106, 108, 110, or 112, or some combination thereof, in order to correct the timing of the circuit. For example, changes can be made in the actual circuit design itself and reflected in the HDL description file. Then, steps 104–114 are repeated. Alternately, various run parameters can be changed to influence the operation of the synthesis tool in step 106. This will produce a somewhat different netlist and steps 106–114 can be repeated. Numerous other modifications are possible in steps 104–112 and will be familiar to those of skill in the art.

However, regardless of the changes made it should be clear that the resulting final design in step 114 must, again, be checked to ensure that it meets timing constraints in step 116. If not, then another iteration through the process is required. This process is repeated until the circuit as synthesized in step 106 and placed in step 110 meets the timing requirements in step 116. The resulting final design data may then be sent to a semiconductor manufacturer for fabrication of the integrated circuit. When the final design meets the timing constraint in step 116, it is said that timing convergence is achieved.

Timing convergence between synthesis and placement remains a challenge for advanced microprocessor designs for several reasons. First, while the wire models used during synthesis provide a reasonable prediction of the average wire length in the design, they are usually quite poor at predicting the actual wire lengths of a particular set of nets. Therefore, for the few nets on a critical path the prediction can be quite inaccurate, and the associated path lengths may be significantly longer than predicted, resulting in a negative slack and require several re-iterations of synthesis and placement.

More particularly, synthesis produces a netlist based on timing considerations but without actual physical design considerations. As a result, the synthesizer might expect a particular net to be "short" with low capacitance while, in fact, after placement this net might be relatively "long". Thus, the other decisions made by the synthesizer regarding the net, such as the selection of a particular cell, may be undesirable.

Second, the wire delay and gate delay can be of almost equal significance in submicron electronic circuit designs. Even when designers can feed wire capacitances from a placed and wired design for re-synthesis, it is not assured that wire capacitances remain the same after a set of logic transformations. This prolongs the timing convergence process by forcing circuit designers to do multiple iterations between the synthesis and placement steps in the circuit design process.

These errors are caught during the chip level timing analysis in step 116 where the actual interconnect length is used. However, this presents the dilemma that, in order to fix the problem, a change in the circuit described by the netlist is required, but such a change results in disturbing the placed and wired design generated by the placement tool. Thus, a new netlist is generated every time a change to the circuit is made. This provides still further timing conversion problems because the circuit that just underwent a logic transformation, such as re-powering, may drive a short net in the new placement, while another circuit that used to drive a short net in the previous iteration may now be forced to drive a long net. Thus, while the iteration solves the problem with respect to the first circuit, it has now created a new problem with respect to the second circuit. Thus, more iterations are required.

SUMMARY OF THE INVENTION

Thus, it is an object of the invention to provide more accurate wire capacitance models to the synthesis tool for its logic optimization. It is a further object of the invention to provide techniques for the synthesis and placement tools to interact with each other at a finer granularity to reduce the number of iterations and yield a more accurate circuit design.

The present invention achieves these objects by providing an integrated placement and synthesis process which provides net length data from the placement tool back to the synthesizer for re-synthesis each time an iteration is performed by the placement tool. Thus, the wire models used by the timing analyzer of the synthesis tool become increasingly accurate as the placement tool locates the circuit components onto the image. When the placement tool has finally completed placing the components of the circuit timing convergence will be substantially assured.

In one particular embodiment of the invention, when the placement tool passes the current placement state to the synthesizer for re-synthesis, the synthesizer automatically performs suitable netlength extractions and, then transformations to the circuit to correct any timing deficiencies created by the placement. The transformed circuit data is then passed back to the placement tool so that the next placement iteration begins with the transformed circuit. In this way, the synthesizer and placement tool operate together at a much finer granularity to provide improved timing convergence.

Another aspect of the invention relates to a method for improving timing convergence in computer aided circuit design. In one particular embodiment, the method comprises the steps of generating a behavioral model of a desired semiconductor circuit which includes timing constraints for individual paths in the circuit, and synthesizing the behavioral model to produce a netlist which represents an implementation of the desired semiconductor circuit mapped to a specific semiconductor technology. The netlist includes a list of components in the circuit and a list of nets which connect the components in the circuits. A synthesizing step is performed which includes a timing analysis of the implementation so that the paths in the circuit represented by the netlist meet the timing constraints, the timing analysis being performed using the estimated wire lengths for the nets. The process then performs the step of placing the components in the netlist into an image representing a predefined area of a semiconductor chip. In this step, placing includes determining actual wire lengths of the nets in the netlist. The steps of synthesizing and placing are then repeated until timing convergence is achieved, wherein the actual wire lengths are substituted for the estimated wire lengths each time the step of synthesizing is repeated. Finally, the circuit represented by the netlist after timing convergence is achieved is routed to produce the final design data.

Still further objects and advantages of the invention will become apparent in view of the following disclosure.

DETAILED DESCRIPTION OF EMBODIMENTS OF THE INVENTION

Figure 1A:
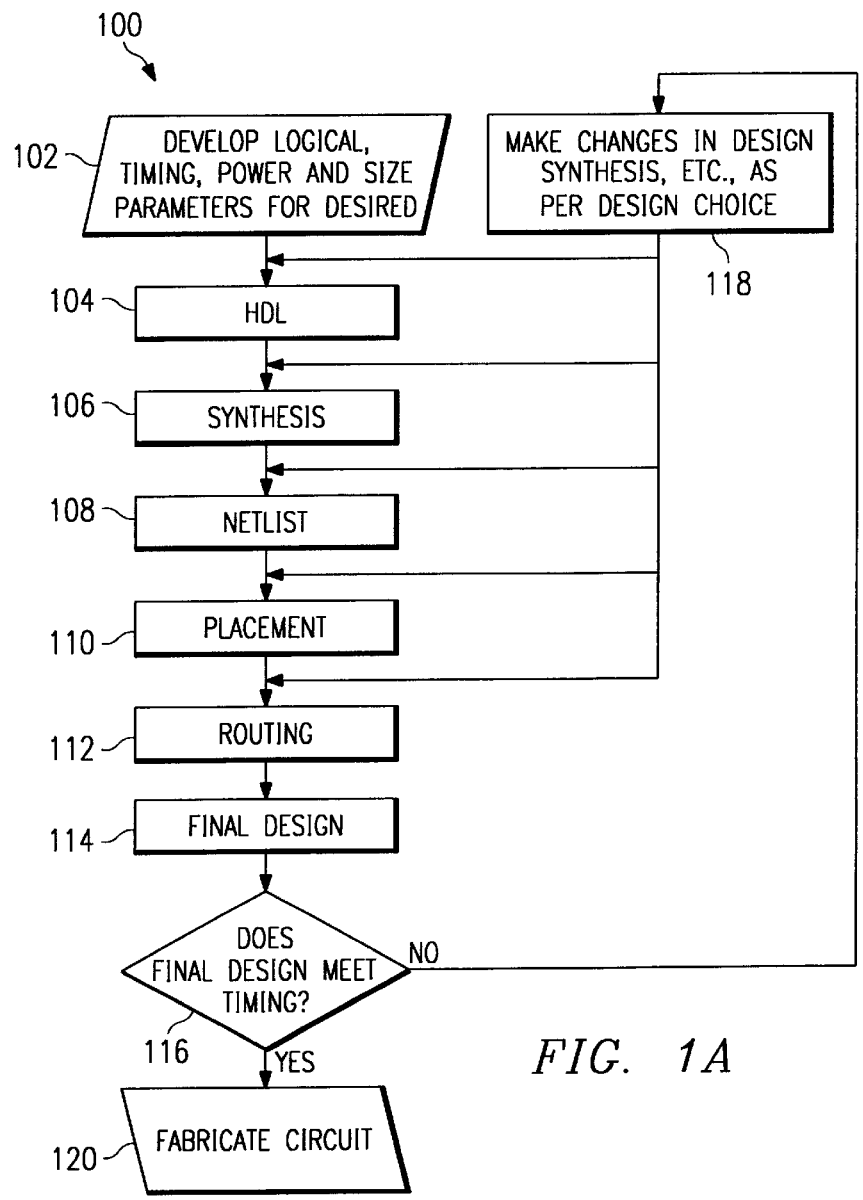
FIG. 1A is a flow chart illustrating a conventional semiconductor design process.
Figure 1B:
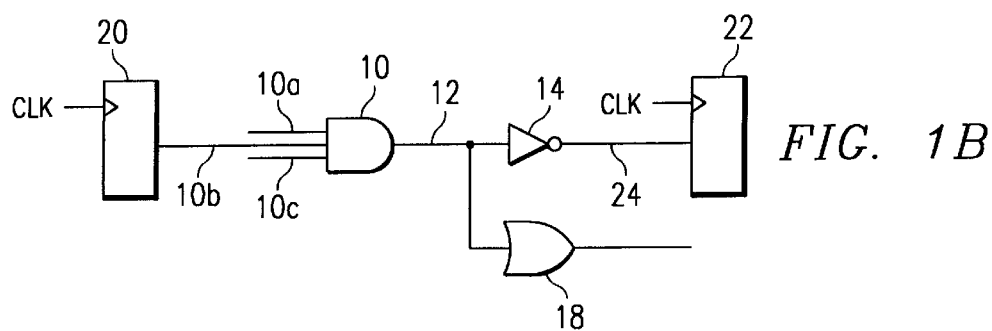
FIG. 1B is a schematic diagram of a circuit for illustrating the operation of the present invention.
Figure 2A:
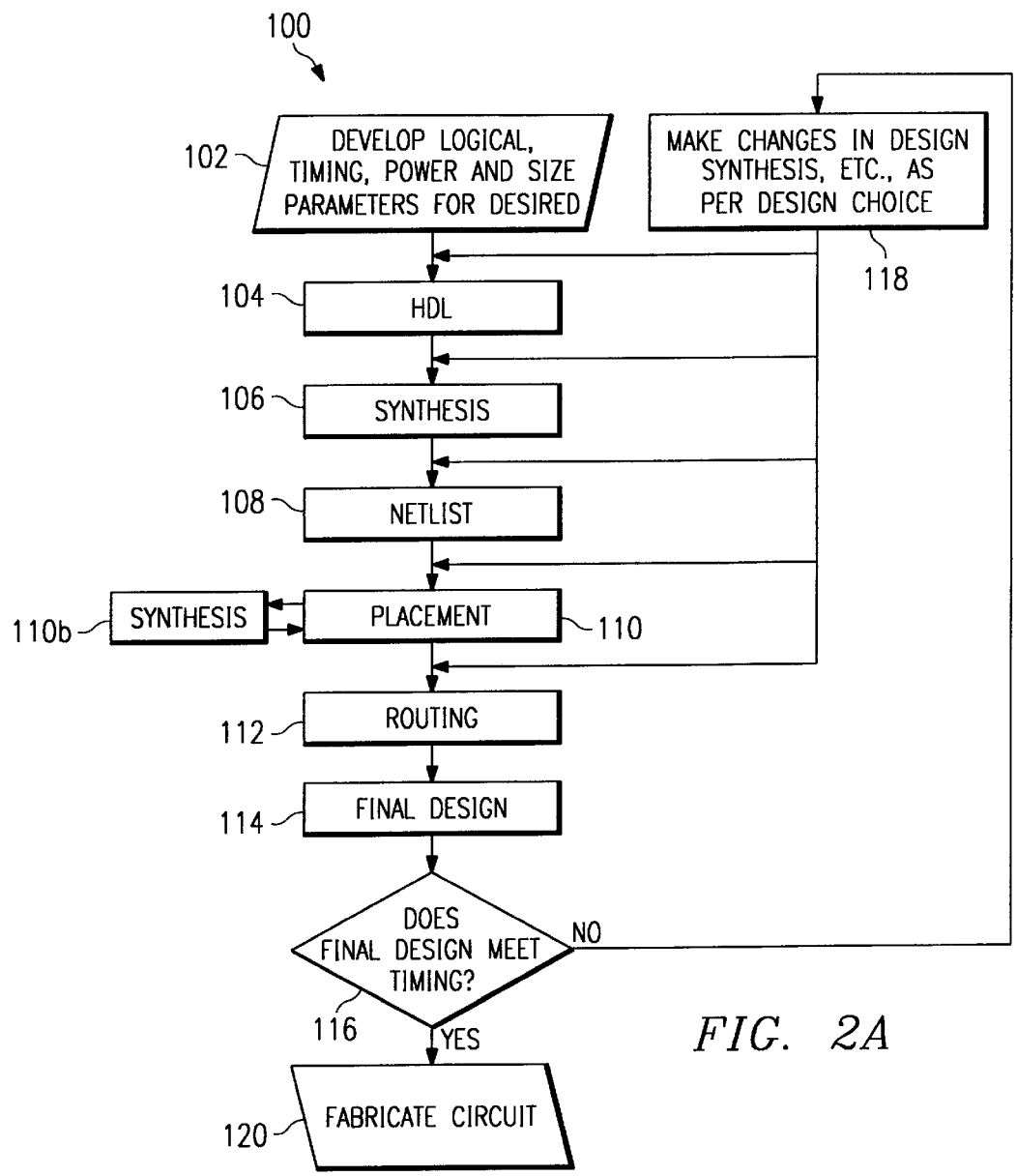
FIG. 2A is a flow chart illustrating a design process according to an embodiment of the invention.

Referring now to FIG. 2A, there is shown a flow chart for a circuit design process according to an embodiment of the invention. The process is advantageously implemented on a workstation or other computer systems having a central processing unit ("CPU"), a user interface, a hard disk or other memory storage for storing a software implementation of the process, random access memory for storing and manipulating the data used in the process and various input and output ports for allowing the workstation to share data with other computer equipment. Data such as the HDL file and the netlist may be provided to the workstation via the user interface or I/O ports. In one embodiment, the initial synthesis is performed by conventional techniques using statistical wire models.

However, placement is modified to integrate synthesis and placement step 110b. The integrated placement process first retrieves the netlist generated by the synthesizer. The netlist is advantageously stored in memory for fast access by the workstation or other computer equipment which is executing the integrated placement process. Once the netlist is retrieved, the process begins by placing the circuit components onto the image according to known techniques, such as the "min-cut" algorithm. The min-cut algorithm, and numerous variations thereof, are well known to those of skill in the art and is more fully described in various publications, such as Kernigham, et al. "An Efficient Heuristic Procedure for Partitioning Graphs," Bell System Technical Journal, 49:291–307 (February 1970), and Krishnamurthy, "An Improved Min-Cut Algorithm for Partitioning VLSI Networks, IEEE Transactions on Computer, C-33(5):438–446 (May 1984), all of which are hereby incorporated by reference. Accordingly, only a brief description will be provided herein for purposes of illustrating embodiments of the invention. The re-synthesis process, integrated according to the invention to improve timely convergence, is described in greater detail with respect to FIG. 2B.

Figure 2B:
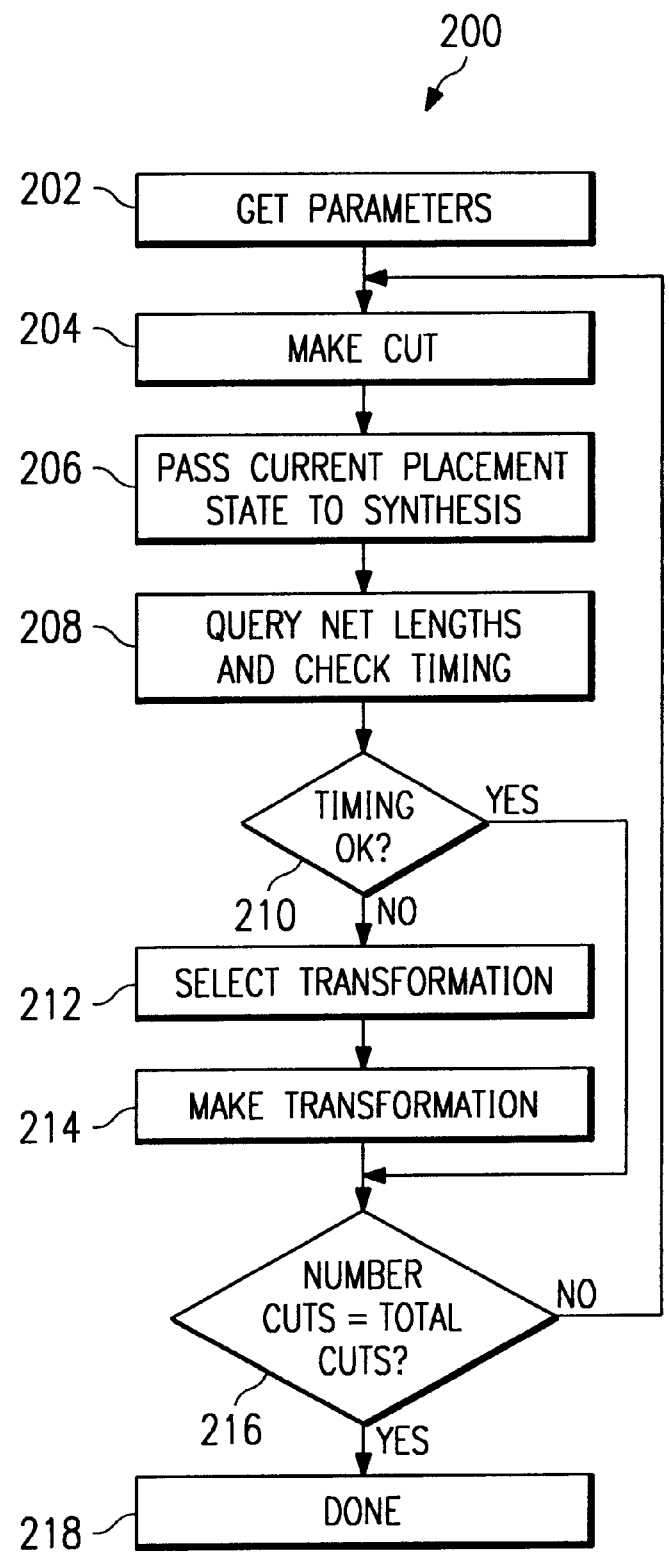
FIG. 2B is a flow chart illustrating a combined synthesis and placement process according to still a further embodiment of the invention.

FIG. 2B is a flow chart illustrating a process for integrated synthesis and placement according to an embodiment of the invention. In step 202, the process is started by the retrieval of various user parameters which will be required. Generally, these user parameters are stored in a file which is accessible by the workstation, or other processing equipment which is performing the integrated synthesis and placement process. These parameters effect the placement decisions made by the placement tool as it arranges and locates the individual circuit components onto the image. Common parameters include the number of cuts for the placer to make, and cost functions which encourage or discourage certain transformations.

Once the user parameters are gathered in step 202, the process proceeds to step 204 where the placement tool partitions the circuit by making the first "cut". More specifically, the placement process places a first cut through the image to form right and left partitions, referred to sometimes as "regions". Next, the cells at the highest level of hierarchy in the circuit are divided into two groups which require approximately equal area for layout in the image. The groups are selected so that the wires crossing the cut boundary are minimized. This helps to ensure that interconnected cells are placed adjacent to each other in order to minimize area and wire length. These two blocks of cells are then placed into the left and right partitions, respectively.

As will be described in greater detail herein, multiple cuts, and hence multiple passes through step 204 are contemplated. Each cut is transverse to the previous cut and subdivides the image into smaller partitions. For example, on the second cut, the left and right partitions are each divided into the "top" and "bottom," resulting in top left, bottom left, top right, and bottom right partitions. Step 204, along with steps 206–216 as discussed later, are then repeated until there are numerous partitions, each of which contains only a small number of leaf level components. At this point, each and every circuit in the design has a physical location that has been narrowed down to a few microns.

After each cut performed by the placement process in step 204, the integrated placement process proceed to step 206 where it passes the current placement state to the synthesizer. As will be clear to those of skill in the art, the current placement state includes the X-Y coordinates of each object placed in the image. The synthesizer utilizes these coordinates to make more accurate timing checks of the paths in the circuit and, also, to make transformations to aid timing convergence.

In step 208, the synthesizer "queries" the netlengths, i.e., extracts detailed information from the placement state provided to determine the lengths of individual nets after placement. It is not necessary to query every net in the circuit. As a matter of design choice the process may query only certain nets, such as all nets with negative slack or nets on the critical path, before it checks timing and makes any transformations. Of course, after the first few cuts, the partitions will be large and each partition will contain multiple placeable objects. When there is more than one placeable object in a partition, each object is presumed to be in the center of the partition. In this case, the synthesizer utilizes conventional statistical models to determine the net lengths for nets connecting objects in the same partition. For objects in different partitions, the synthesizer uses conventional maze routing schemes to determine the netlengths. The maze routing scheme is preferably one which presumes no blockages, i.e., the maze router can route directly from one circuit to another without the necessity of routing around objects or changing metal layers.

The synthesizer may now re-synthesize the circuit, substituting the net lengths queried from the placement state data for the statistical net lengths originally used in the wire models. The synthesizer performs the timing analysis in step 210 to determine whether the circuit still meets timing requirements. Methods for performing timing analysis are well understood in the art. Numerous suitable timing analyzers are commercially available, such as "MOTIVE" available from View Logic Corp., and particular analyzers may be selected as a matter of design choice as long as they allow substitution of the wire lengths queried from the placement state data in the wire model as described above.

If the circuit meets timing constraints in step 210, then the process continues to step 216 where it determines whether the partitioning is complete. No transformation is performed if the timing is satisfactory. Determining whether the partitioning is complete simply involves comparing the number of cuts performed to the number of cuts required.

Generally, the number of cuts required is provided as a parameter to the placer when the process is begun, the number of cuts being determining heuristically as a matter of design choice. Alternately, the number of cuts may be determined through commonly used estimates, for example, one advantageous estimation is: Number of Cuts=$\text{Log}_2$ (Image Size). If partitioning is not complete, then the process repeats steps 204–216. If the circuit meets timing constraints and partitioning is complete, then the placement driven synthesis process is complete as shown in step 218. Afterwards, the remaining processes are performed on the placed and synthesized design data, such as routing and final timing checking before the final circuit design data is sent out to the chip fabricator.

If, in step 210, the circuit no longer meets timing constraints, then the process proceeds to step 212 where it selects an optimizing transform to minimize timing. A transform is an operation on some aspect of the design process which alters a characteristic of the circuit defined in the mapped netlist. Numerous transforms are known to those of skill in the art. For example, one common transform is to "re-power", i.e., change the power requirements of the gates in a particular portion of the circuit. Generally, when a gate is powered-up, its propagation delay time is shortened, although its physical size and power consumption requirements are increased.

Figure 4A:
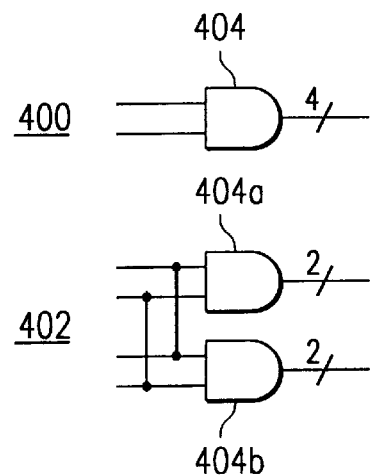
FIGS. 4A–4C are schematic diagrams illustrating synthesis transformations according to embodiments of the invention.

Referring to FIG. 4A, another transform, referred to as replication, is depicted. In this case, circuit 400 is a simple AND gate 404 having two inputs and four outputs, i.e., a fan-out of four. In order to reduce the fan-out of circuit 400, it is possible to replace the single AND gate 404 with a pair of substantially identical AND gates 404a–404b which receive the same inputs. After replication, only two fan-outs are required for each AND gate in order to drive the same four inputs supplied by circuit 400.

Figure 4B:
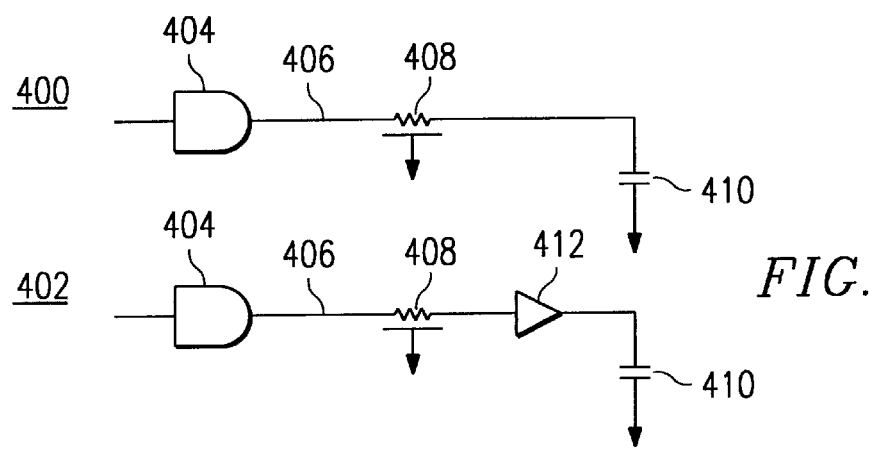

Still another transform, referred to as buffer insertion, is depicted in FIG. 4B. In this case, it is seen that circuit 400 is an AND gate 404 which drives a relatively large capacitive load 410. The output of AND gate 404 is connected to load 410 by a relatively long wire 406. Wire 406 has inherent resistance and capacitance 408, both of which increase proportionately with the length of the wire 406. This presents a large resistance-capacitance ("RC") time constant to the output of AND gate 404, resulting in slow signal propagation times. Circuit 402 has been transformed to address this problem by inserting a buffer 412 in wire 406 before the capacitive load 410. The input to the buffer 412 has a comparatively small capacitive load which operates to reduce the effective RC time constant seen at the output of AND gate 404. The large capacitive load 410 is then driven by the output of buffer 412 across a much shorter wire length.

Figure 4C:
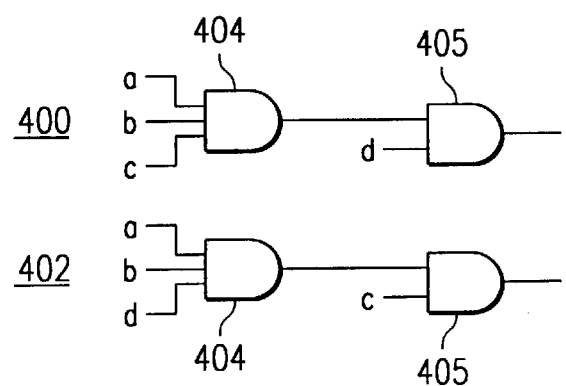

Still another transformation is shown in FIG. 4C. This transformation is referred to as input substitution. As seen in the circuit shown in FIG. 400, inputs a–d must all be high for the output of AND gate 405 to be high. However, for purposes of illustration, it is assumed that input c has the most negative slack. To speed up the performance of the circuit, input d is swapped with input c on AND gates 404 and 405. Thus, the propagation delay for input c is reduced by the propagation delay time of AND gate 404.

Of course, the transforms selected by the synthesizer must be appropriate to address the cause of the timing failure. For example, if there is a long wire length in the critical path, i.e., the signal path and the circuit having the most negative slack, then it would be useful to apply the buffer insertion transform discussed with respect to FIG. 4B.

More specifically, transformations are performed by drivers which are called as routines from the synthesizer. The drivers perform various functions such as: choosing gates in a netlist; applying transforms to each chosen gate and analyzing the transforms. As a matter of design choice, some drivers choose gates that are only on a critical path, some choose gates that have negative slacks and others choose gates that have positive slacks. A driver chooses the "best" transform among several transformation based specified parameters before calling a driver. For example, for speeding up a path, a driver may decide between repowering, logic cloning and buffering in order to find the optimal way to speed up a gate on a path. In synthesis, certain parameters are passed to synthesis so that drivers have criteria in choosing a transform among multiple ones. These parameters dictate the trade off between area/power or delay optimization, number of boxes to be considered for applying transforms, etc. An example of pseudo code for selecting and performing transforms is set forth below.

```
Select transformation:
    driver selects m gates (based on parameters);
    for(each m gates)
    for (each transform passed to the driver)
        apply the transform;
        measure slack and change in size; undo the transform;
        save the best slack and gate size as the result of the transform;
    end for;
    Choose the best transform based on the passed parameters;
    end for;
Apply the chosen transform;
```

Once the appropriate transform has been selected, then the integrated placement process executes the desired transformation in step 214. Of course, it will be recognized that any transformation performed will be reflected in the netlist. For example, if a cell is powered-up, then the netlist will be modified so that a different cell having the new power requirements is selected from the cell library.

Assuming additional cuts are required, then steps 204–216 are repeated. However, when the placement process makes another cut in step 204, it uses the netlist as modified by the synthesizer transform. Thus, if the synthesizer performed a replication transformation, the placer will now attempt to place multiple objects, rather than the one it placed on the previous cut. This becomes critical as the number of cuts progresses. Early in the process, the partitions are still large and changes to the netlist, such as replicating an object, are not likely to cause a violation of placement rules or physical overlap of placed objects. However, as the number of cuts increases, the size of the partitions become smaller, and the synthesizer cost function must be increased to cause the synthesizer to avoid the use of certain transformations which could result in overlap violations by the placer. In another embodiment of the invention, the placer is provided with an additional step for allowing it to undo a previous cut if the synthesizer performs an undesirable transformation.

A more specific embodiment of the invention is described with respect to the following pseudo code:

```
min_cut_placement()
set U, D and C to user defined values;
num_of_cut = 0;
do
    if (num_of_cut == in {C})
        Fanout_correction();
    if (num_of_cut == in {U})
        Power_up();
    if (num_of_cut == in {D})
        Minimize_area();
    endif
    num_of_cut ++;
while (there are cuts to be processed);
power_up()
    repower_cells_on_critical_path();
minimize_area()
    powerdown_cells_with_positive_slack();
```

As will be understood by those familiar with synthesis and placement algorithms, the above code is useful with a modified synthesis routine that is allowed to be called as a subroutine from the placement algorithm. A callback is registered with the cut generator and the callback is allowed to change the size of any circuit. For the above code, a design is read in with a certain required number of cuts. A callback is registered with the placement tool to execute logic synthesis transformations after each cut (this code decides what transformations need to be applied and at what cut intervals). After each cut, the number of regions on the chip is doubled. For simplicity, wire capacitance inside each region ("Wci") can be assumed to be zero. In alternate embodiments, non-zero values of Wci are used to observe its effects on the final results. Wire capacitances among regions are non-zero. For unplaced objects in each region, wire capacitance is measured from the center of the region based on a maze routing scheme. Synthesis can use new wire estimates after each cut to better tune the design using more accurate wire capacitances.

Of course, the placer itself can also perform certain transformations. Moreover, it is desirable that the placement tool optimize the circuit with respect to a given parameter, or set of parameters, such as timing, size, or power consumption. This, in turn, effects the wire lengths of the nets as will be described in greater detail with respect to FIGS. 3A–3B.

Figure 3A:
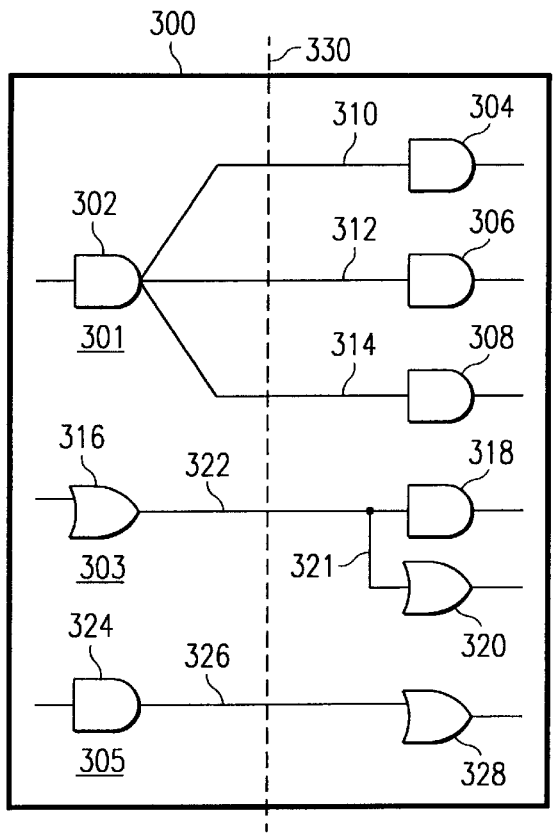
FIGS. 3A and 3B are schematic diagrams illustrating the operation of a placement process according to an embodiment of the invention.
Figure 3B:
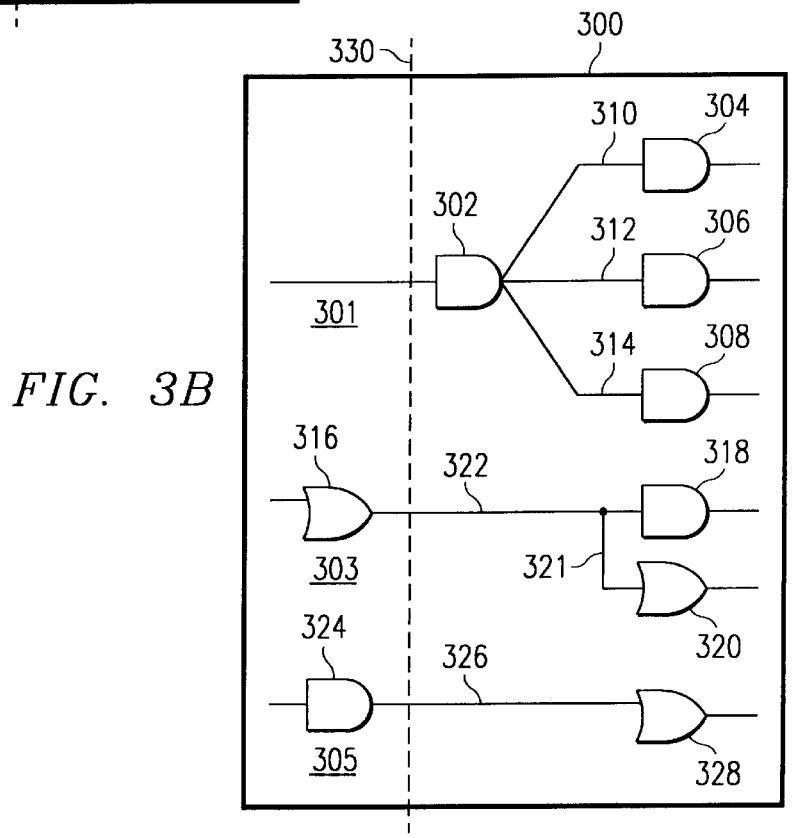

FIG. 3A is a schematic diagram showing three separate sub-circuits 301, 303 and 305 as initially laid out on the image 300 of the semiconductor chip. Sub-circuit 301 includes an AND gate 302 having an output that fans out on three separate nets 310, 312, and 314 to three separate AND gates 304, 306, and 308, respectively. Sub-circuit 303 includes an OR gate 316 which fans out on nets 322 and 321 to AND gate 318 and OR gate 320. Sub-circuit 305 includes AND gate 324 which is connected to OR gate 328 by net 326. The integrated placement process, sometimes referred to herein as the placer, begins operation by making an initial cut 330 through the center of the image 300. With respect to sub-circuit 301, it is seen that nets 310, 312, and 314 all cross the cut line 330. In order to reduce the amount of space required by a circuit, it is desirable to minimize the number of wires which cross a particular cut line. Therefore, in an effort to optimize sub-circuit 301, the placer changes the layout of the circuit components so that AND gate 302 is moved to the opposite side of the cut line 330, as shown in FIG. 3B. Now, only one line, i.e., the input to AND gate 302 crosses cut 330. Of course, it is also seen that nets 310, 312 and 314 are much shorter than they were prior to optimization by the placement tool.

It is also desirable for the placer to minimize wire lengths, where possible, in order to reduce the capacitance, and hence the propagation delay, of the net. Thus, with respect to sub-circuit 305, it is seen that net 326 which connects AND gate 324 and OR gate 328 spans almost the entire width of the image 300. In this example, the placer optimizes this sub-circuit by moving AND gate 324 and OR gate 328 closer together near the cut 330. This drastically shortens the wire length required for net 326 as seen in the figures.

Also, in some cases, the placer will not make any changes to the layout of a particular sub-circuit or nets. For example, sub-circuit 303 remains substantially the same as shown in FIGS. 3A and 3B.

It will be clear to those of skill in the art that the above placement examples are intended for purposes of illustration only. The changes made to actual circuits during placement are a matter of design choice, and the parameters supplied in step 202 of the process. However, it should be clear from the above examples, that, with each cut, the wire lengths of various nets of the circuit are likely to be significantly altered.

Of course, other transforms are known to those of skill in the art, and various combinations of transforms may be used as a matter of design choice. Moreover, the transforms discussed above are applied during re-synthesis of the circuit. However, in other embodiments, step 214 may be modified to select transforms which are applied during placement, such as grouping of objects in the netlist, fixed placement of objects in the image, assigning of objects to various areas of the image, net waiting, and the addition of capacitance targets and the placement of cost function.

Assuming that the timing constraints and other parameters required for the circuit are achievable with the technology selected for implementation, then eventually timing convergence will be attained in step 210 at the same time partitioning is complete in step 216. In this case, the circuit as synthesized and placed may now be routed to produce the final design. Since timing convergence was necessarily achieved in step 210, there is a high probability that the circuit will pass the final timing analysis check in step 116 of FIG. 2A. This prevents the numerous costly and time consuming iterations required by conventional systems in which synthesis and placement are performed independently.

Although the invention has been described with respect to particular embodiments, it is understood that numerous variations will occur to those of skill in the art without departing from the scope and the spirit of the present invention. All publications referred to herein are hereby incorporated by reference as though set forth in full.

Figure 5:
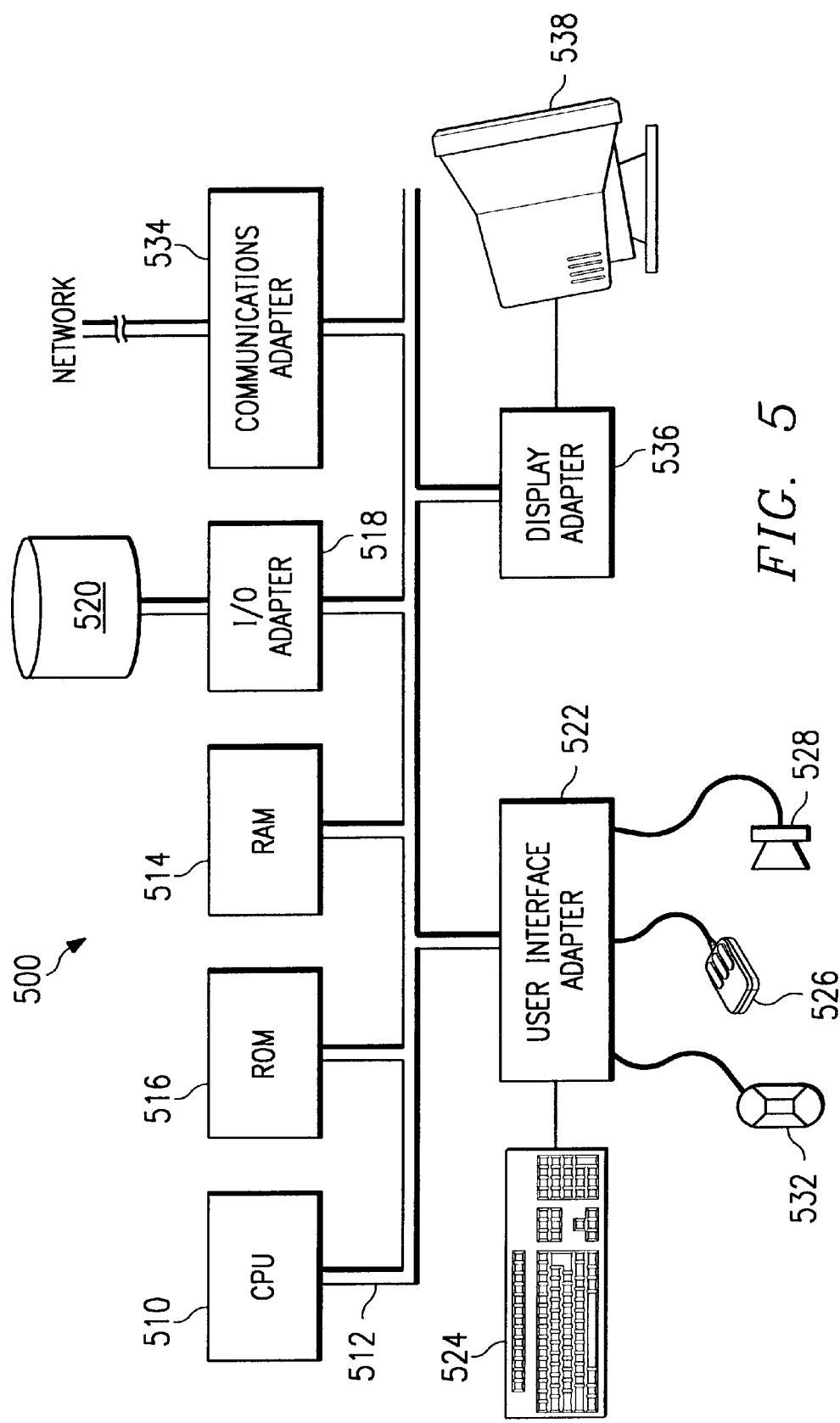
FIG. 5 is a block diagram of a data processing system which may be used in an embodiment of the invention.

Referring to FIG. 5, a data processing system 10 is shown which may be used for the invention. A central processing unit (CPU) is provided, such as a PowerPC microprocessor ("PowerPC" is a trademark of IBM Corporation) according "The PowerPC Architecture: A Specification for a New Family of RISC Processors", 2d edition, 1994, Cathy May, et al. Ed., which is incorporated herein by reference. The CPU is coupled to various other components by system bus 512. Read only memory ("ROM") 16 is coupled to the system bus 512 and includes a basic input/output system ("BIOS") that controls certain basic functions of the data processing system. Random access memory ("RAM") 514, I/O adapter 518, and communications adapter 534 are also coupled to the system bus 512. I/O adapter 518 may be a small computer system interface ("SCSI") adapter that communicates with a disk storage device 520. Communications adapter 534 interconnects bus 512 with an outside network enabling the data processing system to communication with other such systems. Input/Output devices are also connected to system bus 512 via user interface adapter 522 and display adapter 536. Keyboard 524, track ball 532, mouse 526 and speaker 528 are all interconnected to bus 512 via user interface adapter 522. Display monitor 538 is connected to system bus 512 by display adapter 536. In this manner, a user is capable of inputting to the system throughout the keyboard 524, trackball 532 or mouse 526 and receiving output from the system via speaker 528 and display 538. Additionally, an operating system such as DOS or the OS/2 system ("OS/2") is a trademark of the IBM Corporation) is used to coordinate the functions of the various components shown in FIG. 5.

Preferred implementations of the invention include implementations as a computer system programmed to execute the method or methods described herein, and as a computer program product. According to the computer system implementation, sets of instructions for executing the method or methods are resident in the random access memory 514 of one or more computer systems configured generally as described above. Until required by the computer system, the set of instructions may be stored as a computer program product in another computer memory, for example, in disk drive 520 (which may include a removable memory such as an optical disk or floppy disk for eventual use in the disk drive 520). Further, the computer program product can also be stored at another computer and transmitted when desired to the user's work station by a network or by an external network such as the Internet. One skilled in the art would appreciate that the physical storage of the sets of instructions physically changes the medium upon which it is stored so that the medium carries changes the medium upon which it is stored so that the medium carries computer readable information. The change may be electrical, magnetic, chemical or some other physical change. While it is convenient to describe the invention in terms of instructions, symbols, characters, or the like, the reader should remember that all of these and similar terms should be associated with the appropriate physical elements.

Note that the invention describes terms such as comparing, validating, selecting or other terms that could be associated with a human operator. However, for at least a number of the operations described herein which form part of the present invention, no action by a human operator is desirable. The operations described are, in large part, machine operations processing electrical signals to generate other electrical signals.

What is claimed:

1. A method for improving timing convergence in computer aided semiconductor circuit design, the method comprising the steps of:

generating a behavioral model of a desired semiconductor circuit, the behavioral model including timing constraints for individual paths in the circuit;

synthesizing the behavioral model to produce a netlist which represents an implementation of the desired semiconductor circuit mapped to a specific semiconductor technology, the netlist including a list of components in the circuit and a list of nets which connect the components in the circuit, the step of synthesizing including performing a timing analysis on the implementation set forth in the netlist so that the paths in the circuit represented by the netlist meet the timing constraints, the timing analysis being performed using estimated wire lengths for the nets;

placing the components in the netlist into an image representing a predefined area of a semiconductor chip, the step of placing including determining actual wire lengths for the nets in the netlist;

performing a timing analysis on the implementation set forth in the netlist using the actual wire lengths for the nets in the netlist;

modifying the netlist in the event the timing analysis using the actual wire lengths indicates a violation of any of the timing constraints;

placing the components in the modified netlist into the image representing the predefined area of the semiconductor chip, the step of placing the components in the modified netlist including determining actual wire lengths for the nets in the modified netlist;

performing a timing analysis on the implementation set forth in the modified netlist using the actual wire lengths for the nets in the modified netlist;

repeating the steps of modifying the netlist, placing the components in the modified netlist, and performing the timing analysis on the implementation set forth in the modified netlist using the actual wire lengths for the nets in the modified netlist until said timing analysis on the implementation set forth in the modified netlist indicates no violation of any of the timing constraints; and routing the circuit represented by the modified netlist after the timing analysis on the implementation set forth in the modified netlist indicates no violation of any of the timing constraints.

2. A method as in claim 1 wherein the step of placing comprises defining cuts across the image to create multiple partitions within in the image, the locations for the components being established in the image with respect to the partitions.

3. A method as in claim 2 wherein the step of synthesizing is repeated after every cut.

4. A method as in claim 2 wherein the step of synthesizing is repeated after a predetermined number of cuts.

5. A method as in claim 1 further comprising performing a transform on the circuit after the step of placing if a path in the circuit does not meet its associated timing constraints.

6. A method as in claim 1 wherein the step of generating a behavioral model comprises describing the desired circuit in a hardware description language.

7. A computer aided semiconductor circuit design system having improved timing convergence, the system comprising:

means for generating behavioral model of a desired semiconductor circuit, the behavioral model including timing constraints for individual paths in the circuit;

means for synthesizing the behavioral model to produce a netlist which represents an implementation of the desired semiconductor circuit mapped to a specific semiconductor technology, the netlist including a list of components in the circuit and a list of nets which connect the components in the circuit, wherein the means for synthesizing includes means for performing a timing analysis on the implementation so that the paths in the circuit represented by the netlist meet the timing constraints, the timing analysis being performed using estimated wire lengths for the nets;

means for placing the components in the netlist into an image representing a predefined area of a semiconductor chip, wherein the means for the placing includes a means for determining actual wire lengths for the nets in the netlist;

means for performing a timing analysis on the implementation set forth in the netlist using the actual wire lengths for the nets in the netlist;

means for modifying the netlist in the event the timing analysis using the actual wire lengths indicates a violation of any of the timing constraints;

means for placing the components in the modified netlist into the image representing the predefined area of the semiconductor chip, wherein the means for placing the components in the modified netlist includes means determining actual wire lengths for the nets in the modified netlist;

means for performing a timing analysis on the implementation set forth in the modified netlist using the actual wire lengths for the nets in the modified netlist;

means for repeating the functions of modifying the netlist, placing the components in the modified netlist, and performing the timing analysis on the implementation set forth in the modified netlist using the actual wire lengths for the nets in the modified netlist until said timing analysis on the implementation set forth in the modified netlist indicates no violation of any of the timing constraints; and means for routing the circuit represented by the modified netlist after the timing analysis on the implementation set forth in the modified netlist indicates no violation of any of the timing constraints.

8. A system as in claim 7 wherein the means for placing comprises a means for defining cuts across the image to create multiple partitions within the image so that the locations for the components are established in the image with respect to the partitions.

9. A system as in claim 8 wherein the means for substituting the actual wire lengths for the estimated wire lengths performs re-synthesis after every cut.

10. A system as in claim 8 wherein the means for substituting the actual wire lengths for the estimated wire lengths performs re-synthesis after a predetermined number of cuts.

11. A system as in claim 7 further comprising means for transforming the circuit after if a path in the circuit does not meet its associated timing constraints.

12. A program storage device readable by a machine, tangibly embodying a program of instructions executable by the machine to perform method steps for placing circuit elements in an integrated circuit image, said method steps comprising:

generating behavioral model of a desired semiconductor circuit, the behavioral model including timing constraints for individual paths in the circuit;

synthesizing the behavioral model to produce a netlist which represents an implementation of the desired semiconductor circuit mapped to a specific semiconductor technology, the netlist including a list of components in the circuit and a list of nets which connect the components in the circuit, the step of synthesizing including performing a timing analysis on the implementation so that the paths in the circuit represented by the netlist meet the timing constraints, the timing analysis being performed using estimated wire lengths for the nets;

placing the components in the netlist into an image representing a predefined area of a semiconductor chip, the step of placing including determining actual wire lengths for the nets in the netlist;

performing a timing analysis on the implementation set forth in the netlist using the actual wire lengths for the nets in the netlist;

modifying the netlist in the event the timing analysis using the actual wire lengths indicates a violation of any of the timing constraints;

placing the components in the modified netlist into the image representing the predefined area of the semiconductor chip, the step of placing the components in the modified netlist including determining actual wire lengths for the nets in the modified netlist;

performing a timing analysis on the implementation set forth in the modified netlist using the actual wire lengths for the nets in the modified netlist;

repeating the steps of modifying the netlist, placing the components in the modified netlist, and performing the timing analysis on the implementation set forth in the modified netlist using the actual wire lengths for the nets in the modified netlist until said timing analysis on the implementation set forth in the modified netlist indicates no violation of any of the timing constraints; and routing the circuit represented by the modified netlist after the timing analysis on the implementation set forth in the modified netlist indicates no violation of any of the timing constraints.

\* \* \* \* \*